US012657758B2

(12) United States Patent
Jeon et al.

(10) Patent No.: US 12,657,758 B2
(45) Date of Patent: Jun. 16, 2026

(54) VEHICLE AND CONTROL METHOD THEREOF

(71) Applicants: HYUNDAI MOTOR COMPANY, Seoul (KR); KIA CORPORATION, Seoul (KR)

(72) Inventors: Eunseok Jeon, Seongnam-si (KR); Minjun Chun, Seongnam-si (KR); Jaehong Lee, Siheung-si (KR); Jinho Park, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 242 days.

(21) Appl. No.: 18/526,701

(22) Filed: Dec. 1, 2023

(65) Prior Publication Data
US 2024/0212194 A1     Jun. 27, 2024

(30) Foreign Application Priority Data
Dec. 27, 2022    (KR) ........................ 10-2022-0186203

(51) Int. Cl.
  *G06T 7/70*      (2017.01)
  *B60W 40/02*     (2006.01)
       (Continued)
(52) U.S. Cl.
  CPC .............. *G06T 7/70* (2017.01); *B60W 40/02* (2013.01); *B60W 40/10* (2013.01); *G06T 7/13* (2017.01); *G06T 7/536* (2017.01); *G06T 7/73* (2017.01); *G06V 10/44* (2022.01); *G06V 10/762* (2022.01); *G06V 20/588* (2022.01); *H04N 23/50* (2023.01);
       (Continued)

(58) Field of Classification Search
  CPC .. G06T 7/13; G06T 7/536; G06T 7/70; G06T 7/73; G06T 2207/30244; G06T 2207/30256; G06V 10/44; G06V 10/762; G06V 20/588; B60W 40/02; B60W 40/10; B60W 2420/403; H04N 23/50
  See application file for complete search history.

(56) References Cited

U.S. PATENT DOCUMENTS 6,456,730 B1 *   9/2002   Taniguchi ............... G06T 7/246
                                                          382/103
9,357,208 B2 *   5/2016   Gupta .................. H04N 17/002
              (Continued)

FOREIGN PATENT DOCUMENTS

KR         101268473 B1      6/2013
KR         101549165 B1      9/2015
              (Continued)

*Primary Examiner* — Jennifer Mehmood
*Assistant Examiner* — Jose M Torres
(74) *Attorney, Agent, or Firm* — Lempia Summerfield Katz LLC

(57)        ABSTRACT

A control method of a vehicle includes: detecting straight lines in an image input from a camera; generating a vanishing point candidate based on an intersection of the straight lines; accumulating the vanishing point candidate; generating a vanishing point accumulation map based on the accumulated vanishing point candidates; estimating a pose of the camera based on vanishing point cluster information of the vanishing point accumulation map; and adjusting a distance to an object in the image based on the pose of the camera.

19 Claims, 10 Drawing Sheets

(51) Int. Cl.

| | | |
|---|---|---|
| *B60W 40/10* | (2012.01) | |
| *G06T 7/13* | (2017.01) | |
| *G06T 7/536* | (2017.01) | |
| *G06T 7/73* | (2017.01) | |
| *G06V 10/44* | (2022.01) | |
| *G06V 10/762* | (2022.01) | |
| *G06V 20/56* | (2022.01) | |
| *H04N 23/50* | (2023.01) | |

(52) U.S. Cl.
CPC ................ *B60W 2420/403* (2013.01); *G06T 2207/30244* (2013.01); *G06T 2207/30256* (2013.01)

(56) References Cited

U.S. PATENT DOCUMENTS

| | | | | |
|---|---|---|---|---|
| 9,547,795 | B2 * | 1/2017 | Gupta ................... | H04N 7/183 |
| 10,650,529 | B2 * | 5/2020 | Jang ..................... | G06V 20/588 |
| 11,023,748 | B2 * | 6/2021 | Sagong ................... | G01S 5/021 |
| 11,367,213 | B2 * | 6/2022 | Sagong ................... | G06T 11/00 |
| 2009/0037039 | A1 * | 2/2009 | Yu ............................ | G06T 7/73 |
| | | | | 701/19 |
| 2010/0097455 | A1 * | 4/2010 | Zhang ................. | G06V 20/588 |
| | | | | 701/25 |

| | | | | |
|---|---|---|---|---|
| 2013/0266175 | A1 * | 10/2013 | Zhang ................. | G06V 10/457 |
| | | | | 382/103 |
| 2015/0049193 | A1 * | 2/2015 | Gupta ....................... | G06T 7/85 |
| | | | | 348/148 |
| 2016/0014406 | A1 * | 1/2016 | Takahashi ................. | G01S 5/16 |
| | | | | 348/148 |
| 2017/0129535 | A1 * | 5/2017 | You ........................ | B62D 1/286 |
| 2019/0251371 | A1 * | 8/2019 | Diedrich ............... | G06V 10/96 |
| 2019/0259176 | A1 * | 8/2019 | Dai ........................... | G06T 7/73 |
| 2019/0325638 | A1 * | 10/2019 | Lucas ....................... | G06T 7/55 |
| 2020/0082178 | A1 * | 3/2020 | Ahn ........................ | G06T 7/187 |
| 2020/0160561 | A1 * | 5/2020 | Dai ...................... | G06V 20/588 |
| 2020/0410255 | A1 * | 12/2020 | Guo ....................... | G06N 3/084 |
| 2022/0383644 | A1 * | 12/2022 | Takano ............... | G06V 10/753 |
| 2023/0097780 | A1 * | 3/2023 | Kim ....................... | G06V 20/56 |
| | | | | 701/28 |

FOREIGN PATENT DOCUMENTS

| | | | |
|---|---|---|---|
| KR | 20170031282 | A | 3/2017 |
| KR | 20170059029 | A | 5/2017 |
| KR | 20170114523 | A | 10/2017 |
| KR | 20180136057 | A | 12/2018 |
| KR | 20200000953 | A | 1/2020 |

\* cited by examiner

Figure 7:
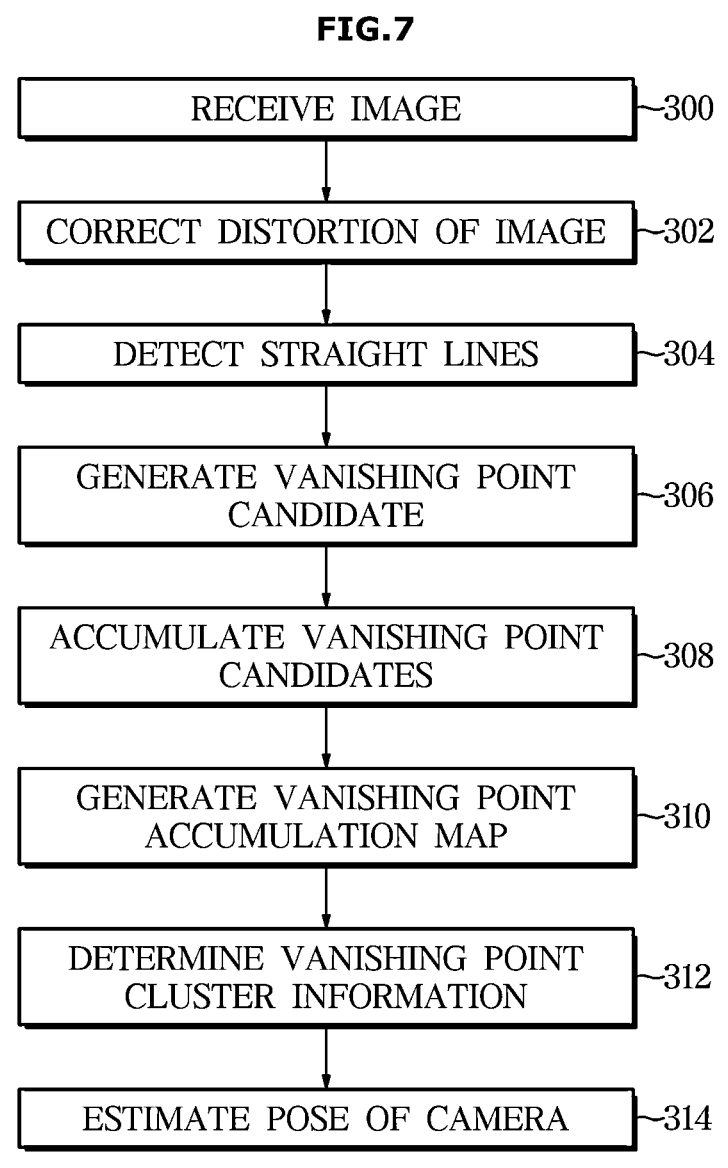

RECEIVE IMAGE ─300

↓

CORRECT DISTORTION OF IMAGE ─302

↓

DETECT STRAIGHT LINES ─304

↓

GENERATE VANISHING POINT CANDIDATE ─306

↓

ACCUMULATE VANISHING POINT CANDIDATES ─308

↓

GENERATE VANISHING POINT ACCUMULATION MAP ─310

↓

DETERMINE VANISHING POINT CLUSTER INFORMATION ─312

↓

ESTIMATE POSE OF CAMERA ─314

FIG.9

VEHICLE AND CONTROL METHOD THEREOF

CROSS-REFERENCE TO RELATED APPLICATION

This application claims priority under 35 U.S.C. § 119 to Korean Patent Application No. 10-2022-0186203, filed on Dec. 27, 2022, the disclosure of which is incorporated herein by reference.

FIELD

The present disclosure relates to a vehicle and a control method thereof that may estimate a pose of a camera using an image input by a camera mounted on the vehicle during driving.

BACKGROUND

Cameras are a vital component in vehicles that come equipped with an advanced driver assistance system (ADAS) for autonomous driving or collision warnings.

Such vehicles recognize an object from an image input by a camera, obtain information related to the object, and acquire a location of the object using the obtained information.

A pose of a camera is required to be accurately identified for tolerance compensation of camera mounted.

Because a pose of a camera may not be precisely estimated during driving, estimation of camera pose may not be performed accurately and reliably, causing poor quality around-view images due to an error in distance to an object. The statements in this section merely provide background information related to the present disclosure and do not necessarily constitute prior art.

SUMMARY

An aspect of the present disclosure provides a vehicle and a control method thereof that may estimate a pose of a camera using cumulative vanishing point information in which vanishing point candidates in an image input by the camera mounted on the vehicle are accumulated.

Additional aspects of the present disclosure are set forth, in part, in the following description and should be, in part, apparent from the description or may be learned by practice of the present disclosure.

According to an embodiment of the disclosure, a control method of a vehicle may include detecting straight lines in an image input from a camera. The control method of the vehicle may also include generating a vanishing point candidate based on an intersection of the straight lines. The control method of the vehicle may also include accumulating the vanishing point candidate. The control method of the vehicle may also include generating a vanishing point accumulation map based on the accumulated vanishing point candidates. The control method of the vehicle may also include estimating a pose of the camera based on vanishing point cluster information of the vanishing point accumulation map. The control method of the vehicle may also include adjusting a distance to an object in the image based on the pose of the camera.

The generating of the vanishing point candidate may include obtaining the intersection of the straight lines and generating the obtained intersection as the vanishing point candidate.

The accumulating of the vanishing point candidate may include accumulating the vanishing point candidates generated while the vehicle is driving.

The generating of the vanishing point accumulation map may include generating a two-dimensional (2D) vanishing point accumulation map based on image coordinates of the accumulated vanishing point candidates.

The estimating of the pose of the camera may include determining the vanishing point cluster information of the vanishing point accumulation map and estimating the pose of the camera based on the vanishing point cluster information.

The determining of the vanishing point cluster information may include performing a principal component analysis on a vanishing point cluster of the vanishing point accumulation map and determining the vanishing point cluster information according to a result of the principal component analysis.

The determining of the vanishing point cluster information may include obtaining a first principal component vector and a second principal component vector perpendicular to the first principal component vector according to a variance of the vanishing point cluster through the principal component analysis of the vanishing point cluster. The determining of the vanishing point cluster information may also include determining a representative vanishing point and a vanishing line of the vanishing point cluster based on the first principal component vector and the second principal component vector.

The determining of the representative vanishing point and the vanishing line may include determining an intersection of the first principal component vector and the second principal component vector as the representative vanishing point. The determining of the representative vanishing point and the vanishing line may also include determining a straight line that passes the representative vanishing point and is parallel to the first principal component vector as the vanishing line.

The estimating of the pose of the camera may include estimating the pose of the camera based on the vanishing line and the representative vanishing point of the vanishing point cluster information.

The estimating of the pose of the camera may include estimating a roll angle, a yaw angle and a pitch angle of the camera based on the representative vanishing point and the vanishing line.

The estimating of the pose of the camera may include estimating the roll angle of the camera based on a difference between a slope of the vanishing line and a slope of a horizontal line of the image.

The estimating of the pose of the camera may include estimating the yaw angle of the camera based on a distance between the representative vanishing point and a foot of a perpendicular line from an image principal point to the vanishing line.

The estimating of the pose of the camera may include estimating the pitch angle of the camera based on a distance between an image principal point and a foot of a perpendicular line from the image principal point to the vanishing line.

The control method may further include comparing at least one of the estimated roll angle, the estimated yaw angle, or the estimated pitch angle with a mounting angle of a design specification and compensating for a tolerance of the camera according to a result of the comparison.

According to an embodiment of the disclosure, a vehicle may include: a camera configured to photograph an area around the vehicle; and a controller configured to be electrically connected to the camera. The controller may be configured to detect straight lines in an image input from the camera. The controller may also be configured to generate a vanishing point candidate based on an intersection of the straight lines. The controller may also be configured to accumulate the vanishing point candidate. The controller may also be configured to generate a vanishing point accumulation map in which the vanishing point candidates are accumulated. The controller may also be configured to estimate a pose of the camera based on vanishing point cluster information of the vanishing point accumulation map. The controller may also be configured to correct a distance to an object in the image based on the pose of the camera.

The controller may be configured to perform a principal component analysis on a vanishing point cluster of the vanishing point accumulation map. The controller may also be configured to determine the vanishing point cluster information according to a result of the principal component analysis. The controller may also be configured to estimate the pose of the camera based on the vanishing point cluster information.

The controller may be configured to obtain a first principal component vector and a second principal component vector perpendicular to the first principal component vector according to a variance of the vanishing point cluster through the principal component analysis of the vanishing point cluster. The controller may also be configured to determine an intersection of the first principal component vector and the second principal component vector as a representative vanishing point. The controller may also be configured to determine a straight line that passes the representative vanishing point and is parallel to the first principal component vector as a vanishing line.

The controller may be configured to estimate a roll angle of the camera based on a difference between a slope of the vanishing line and a slope of a horizontal line of the image.

The controller may be configured to estimate a yaw angle of the camera based on a distance between the representative vanishing point and a foot of a perpendicular line from an image principal point to the vanishing line.

The controller may be configured to estimate a pitch angle of the camera based on a distance between an image principal point and a foot of a perpendicular line from the image principal point to the vanishing line.

BRIEF DESCRIPTION OF THE DRAWINGS

These and/or other aspects of the present disclosure should become apparent and more readily appreciated from the following description of the embodiments, taken in conjunction with the accompanying drawings of which:

FIG. 1 is a diagram illustrating an arrangement of a plurality of cameras mounted on a vehicle according to an embodiment;

FIGS. 3 and 4 are diagrams illustrating a distance error due to a change in pose of a vehicle according to an embodiment;

FIG. 6 is a diagram illustrating estimating the amount of change in pose of a front camera based on vanishing points in a front image by a vehicle according to an embodiment;

FIG. 7 is a flowchart illustrating a control method of a vehicle according to an embodiment;

FIG. 9 is a diagram illustrating a principal component analysis in a vanishing point accumulation map in a vehicle according to an embodiment.

DETAILED DESCRIPTION

Figure 2:
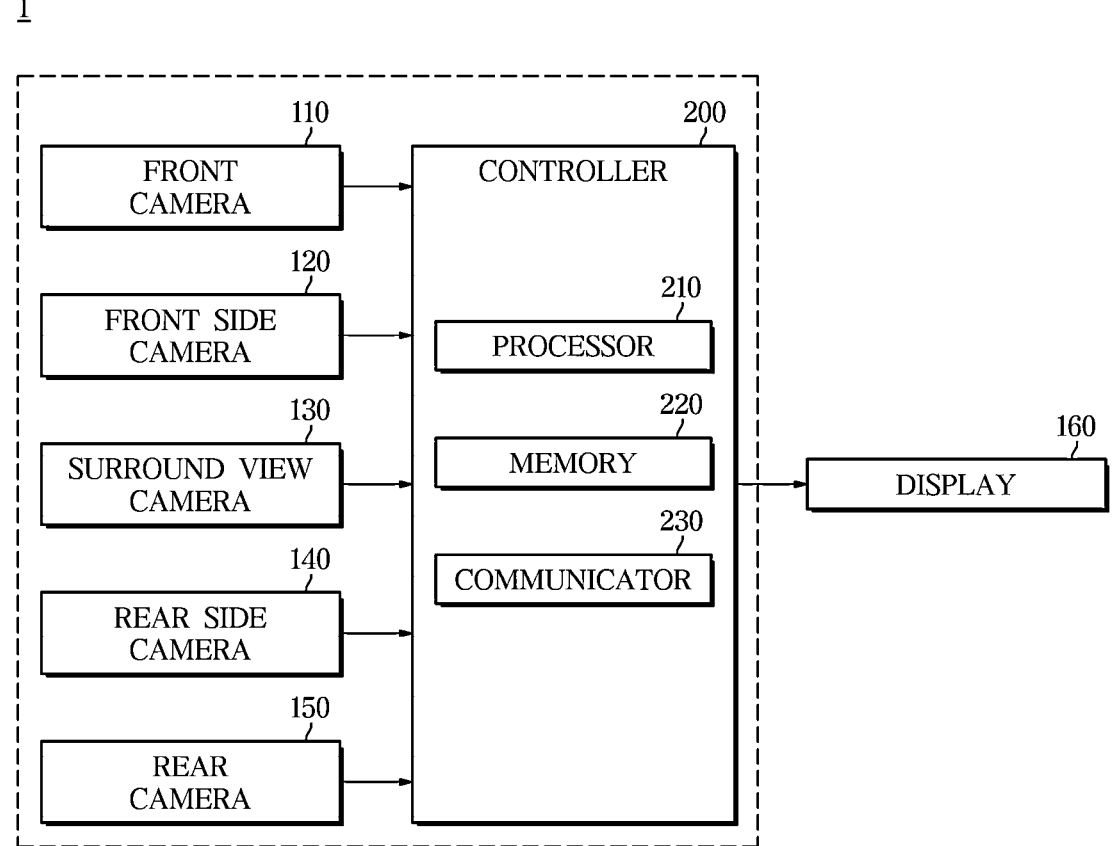
FIG. 2 is a control block diagram illustrating a vehicle according to an embodiment.

Like reference numerals throughout the specification denote like elements. Also, the present disclosure does not describe all the elements according to embodiments of the disclosure, and descriptions well-known in the art to which the present disclosure pertains or overlapped portions are omitted. The terms such as "~part", "~member", "~module", "~device", and the like may refer to at least one process processed by at least one hardware or software. According to embodiments, a plurality of "~parts", "~members", "~modules", "~devices" may be embodied as a single element, or a single of a "~part", "~member", "~module", "~device" may include a plurality of elements. When a part, member, module, device, or the like of the present disclosure is described as having a purpose or performing an operation, function, or the like, the part, member, module, device, or the like should be considered herein as being "configured to" meet that purpose or to perform that operation or function. Each of the part, member, module, device, and the like may separately embody or be included with a processor and a memory, such as a non-transitory computer readable media, as part of the apparatus.

It should be understood that when an element is referred to as being "connected" to another element, it can be directly or indirectly connected to the other element. The indirect connection includes "connection" via a wireless communication network.

It should be understood that the term "include," when used in the present disclosure, specifies the presence of stated features, integers, steps, operations, elements, and/or components. However, the term "include" does not preclude the presence or addition of at least one other features, integers, steps, operations, elements, components, and/or groups thereof.

It should be understood that when it is stated in the present disclosure that a member is located "on" another member, not only a member may be in contact with another member, but also still another member may be present between the two members.

It should be understood that, although the terms first, second, etc. may be used herein to describe various elements, these elements should not be limited by these terms. It should be understood that the singular forms are intended to include the plural forms as well, unless the context clearly dictates otherwise.

Reference numerals used for method steps are used for convenience of explanation and are not intended to limit an order of the steps. Thus, unless the context clearly dictates otherwise, the written order may be practiced otherwise.

Figure 1:
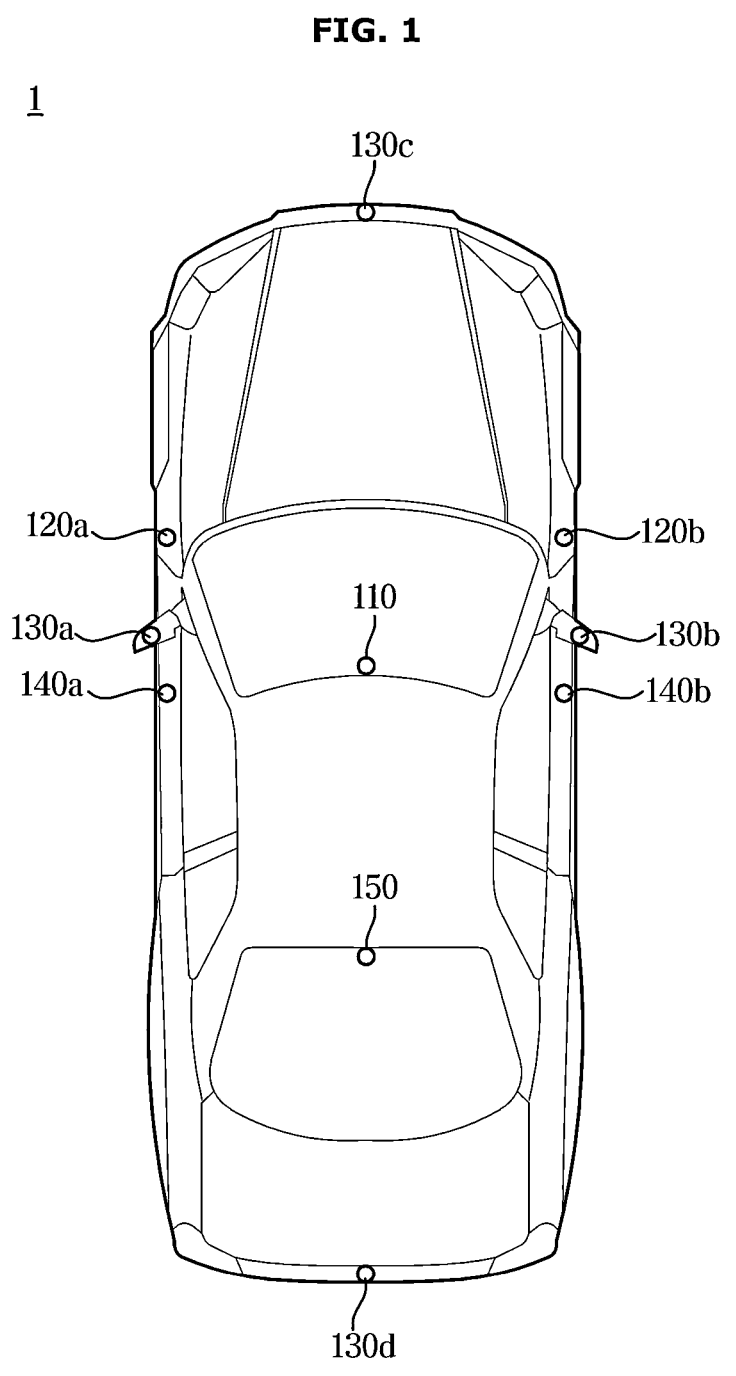

FIG. 1 is a diagram illustrating an arrangement of a plurality of cameras mounted on a vehicle according to an embodiment. FIG. 2 is a control block diagram illustrating a vehicle according to an embodiment.

Referring to FIGS. 1 and 2, a vehicle 1 may assist a driver in operating (driving, braking, and steering) the vehicle 1. For example, the vehicle 1 may detect surroundings around the vehicle 1 (e.g., other vehicles, pedestrians, cyclists, lanes, traffic signs, curbs, guardrails, buildings, road boundaries, and the like). The vehicle 1 may also control the vehicle's driving and/or braking and/or steering in response to the detected surroundings.

The vehicle 1 may provide a variety of functions to the driver. For example, the vehicle 1 may provide the driver with functions for an autonomous driving system, such as a lane departure warning (LDW), a lane keeping assist (LKA), a high beam assist (HBA), an autonomous emergency braking (AEB), a traffic sign recognition (TSR), a smart cruise control (SCC), a blind spot detection (BSD), and the like.

As shown in FIG. 1, the vehicle 1 may include at least one camera. To perform the above functions, the vehicle 1 may be provided with a radar and a laser imaging, detection, and ranging (lidar), in addition to the camera.

The at least one camera may include a charge-coupled device (CCD) or complimentary metal-oxide-semiconductor (CMOS) image sensor and may include a three-dimensional (3D) space recognition sensor, such as a KINECT (RGB-D sensor), time of flight (TOF), stereo camera, etc.

The at least one camera may be provided at different positions on the vehicle 1.

For example, the at least one camera may include a front camera 110, front side camera 120 (120*a* and 120*b*), surround view camera 130 (130*a*, 130*b*, 130*c* and 130*d*), rear side camera 140 (140*a* and 140*b*), and a rear camera 150.

The front camera 110 may be installed on a front windshield glass of the vehicle 1 to secure a front field of view. The front camera 110 may photograph a front of the vehicle 1 and may obtain image data of the front of the vehicle 1. The front camera 110 may detect a moving object in front or an object travelling in adjacent lanes in front lateral fields of view. Front image data of the vehicle 1 may include information of the object located in front of the vehicle 1 (e.g., nearby vehicles, pedestrians, cyclists, lanes, curbs, traffic signs, guardrails, road boundaries, buildings, etc.).

The front side camera 120 (120*a* and 120*b*) may be installed on the front left and right sides of the vehicle 1, such as the A pillar, B pillar, and the like, of the vehicle 1, to secure the front left and right fields of view. The front side camera 120 may photograph the front left and right sides of the vehicle 1 and may obtain image data of the front left and right sides of the vehicle 1.

The surround view camera 130 (130*a*, 130*b*, 130*c* and 130*d*) may be installed on side mirrors (not shown) of the vehicle 1 to secure fields of view toward left and right sides (or lower left and right sides) of the vehicle 1 and may be installed on each of a front bumper and a rear bumper of the vehicle 1 to secure fields of view toward front and rear sides (or lower front and rear sides) of the vehicle 1. The surround view camera 130 may photograph the left and right sides (or lower left and right sides) and front and rear sides (or lower front and rear sides) of the vehicle 1 and may obtain image data of the left and right sides (or lower left and right sides) and front and rear sides (or lower front and rear sides) of the vehicle 1.

The rear side camera 140 (140*a* and 140*b*) may be installed on rear left and right sides of the vehicle 1, such as a C pillar of the vehicle 1, to secure rear left and right fields of view. The rear side camera 140 may photograph the rear left and right sides of the vehicle 1 and may obtain image data of the rear left and right sides of the vehicle 1.

The rear camera 150 may be installed on a rear side of the vehicle, such as a rear bumper, and the like of the vehicle 1, to secure a rear field of view. The rear camera 150 may photograph a rear of the vehicle 1 and may obtain image data of the rear of the vehicle 1.

As shown in FIG. 2, the vehicle 1 may include a display 160.

The display 160 may display surroundings around the vehicle 1 as an image. Here, the image may be an image photographed by a monocular camera or a multi-camera.

The display 160 may display a location of an obstacle around the vehicle 1.

The display 160 may display notification information about collision warning.

The display 160 may display a top view image. Here, the top view image is also referred to as an around-view image or a bird's eye view image.

The display 160 may display a top view image in which a distance error between an actual distance and a recognized distance to an object in an image is corrected.

The display 160 may further include an image sensor and a system-on-chip (SOC) for converting analog signals into digital signals and controlling and processing images.

The display 160 may be provided as a cathode ray tube (CRT), a digital light processing (DLP) panel, a plasma display panel (PDP), liquid crystal display (LCD) panel, electro luminescence (EL) panel, electrophoretic display (EPD) panel, electrochromic display (ECD) panel, light emitting diode (LED) panel, organic LED (OLED) panel, and the like, without being limited thereto.

The vehicle 1 may include a controller 200 performing overall control on the vehicle 1.

The controller 200 may include an image signal processor, which is a processor 210 processing image data of the camera, and/or a micro control unit (MCU) generating a braking signal, and the like.

When an autonomous driving system is in operation, the controller 200 may identify objects in an image based on image information obtained by the front camera 110, may compare information about the identified objects and object information stored in a memory 220, and may determine whether the objects in the image are stationary or moving.

The stationary objects may include lanes, traffic signs, curbs, guardrails, buildings, road boundaries, and the like. The moving objects may include other vehicles, pedestrians, cyclists, bikes, and the like.

When processing image data of the front camera, the controller 200 may estimate the amount of change in pose of the front camera and may estimate a pose of the vehicle based on the estimated amount of change in pose of the front camera. The controller 200 may generate a front image in which a distance error is corrected, based on the pose of the vehicle or on the pose of the front camera. The controller 200 may also display the generated front image on the display 160. The controller 200 may also control an autonomous driving and/or a collision warning based on the front image corrected the distance error.

When processing image data of the multi-camera, the controller 200 may estimate the amount of change in pose of each camera of the multi-camera and may estimate a pose of the vehicle by collecting the estimated amount of change in pose of each of the cameras of the multi-camera. The controller 200 may generate a top view image in which a distance error is corrected based on the pose of the vehicle or on the pose of each camera of the multi-camera. The controller 200 may also display the generated top view image on the display 160. The controller 200 may also control an autonomous driving and/or a collision warning based on the top view image corrected the distance error.

The memory 220 may store a program and/or data for processing image data, a program and/or data for processing radar data, and a program and/or data for the processor 210 to generate a braking signal, a steering signal, and/or a warning signal.

The memory 220 may temporarily store image data received from the monocular camera and/or image data received from the multi-camera and may temporarily store a processing result of the radar data and/or the image data of the memory 220.

The memory 220 may store steering information, braking information, and sensing information related to movement of the vehicle such as a transmission system, and the like.

The memory 220 may store mounting information of the cameras of the vehicle 1, and parallax information which is geometric difference among the cameras. The parallax information is based on positions among the cameras stored from an offline camera calibration (OCC) before shipment.

The memory 220 may be implemented with at least one of a volatile memory such as a random access memory (RAM), a non-volatile memory such as a cache, a flash memory, a read only memory (ROM), a programmable read only memory (PROM), an erasable programmable read only memory (EPROM), an electrically erasable programmable read only memory (EEPROM), etc., or a recording media such as a hard disk drive (HDD), or a compact disc read only memory (CD-ROM), without being limited thereto.

The memory 220 and the processor 210 may be integrated into one chip or provided as separate chips.

The controller 200 may include a communicator 230.

The communicator 230 may communicate with the plurality of cameras, the display, a brake device, a transmission device, a steering device, and the like.

Hereinafter, for convenience of description, described is an example where a distance error to an object occurs due to a change in pose of the front surround view camera 130c having a front field of view among the surround view cameras 130.

Figure 3:
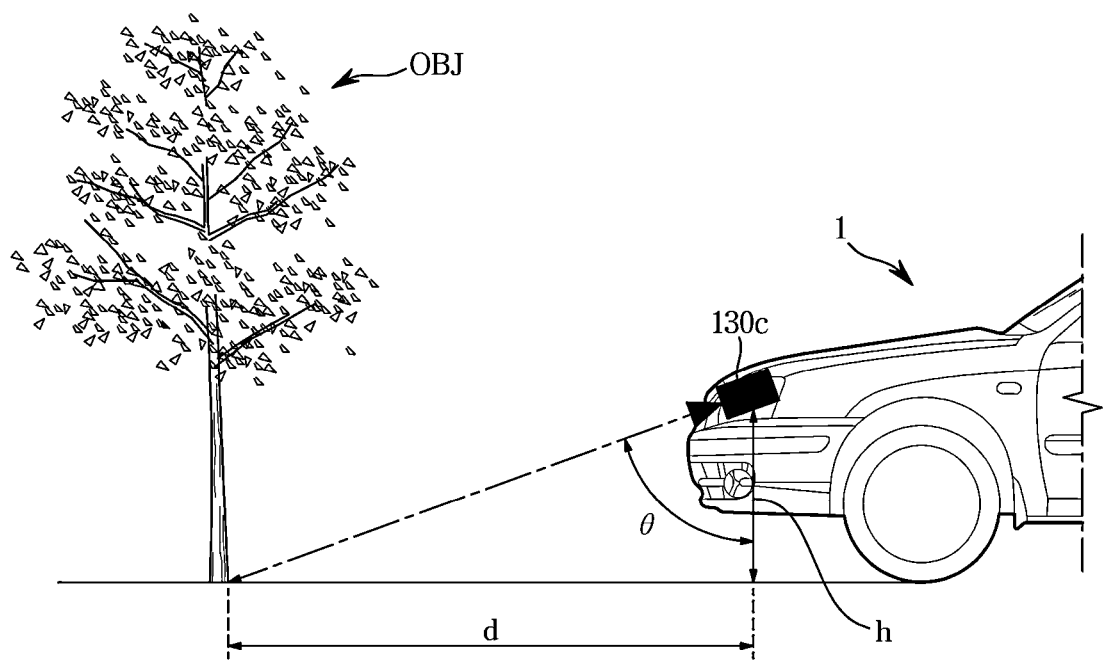
Figure 4:
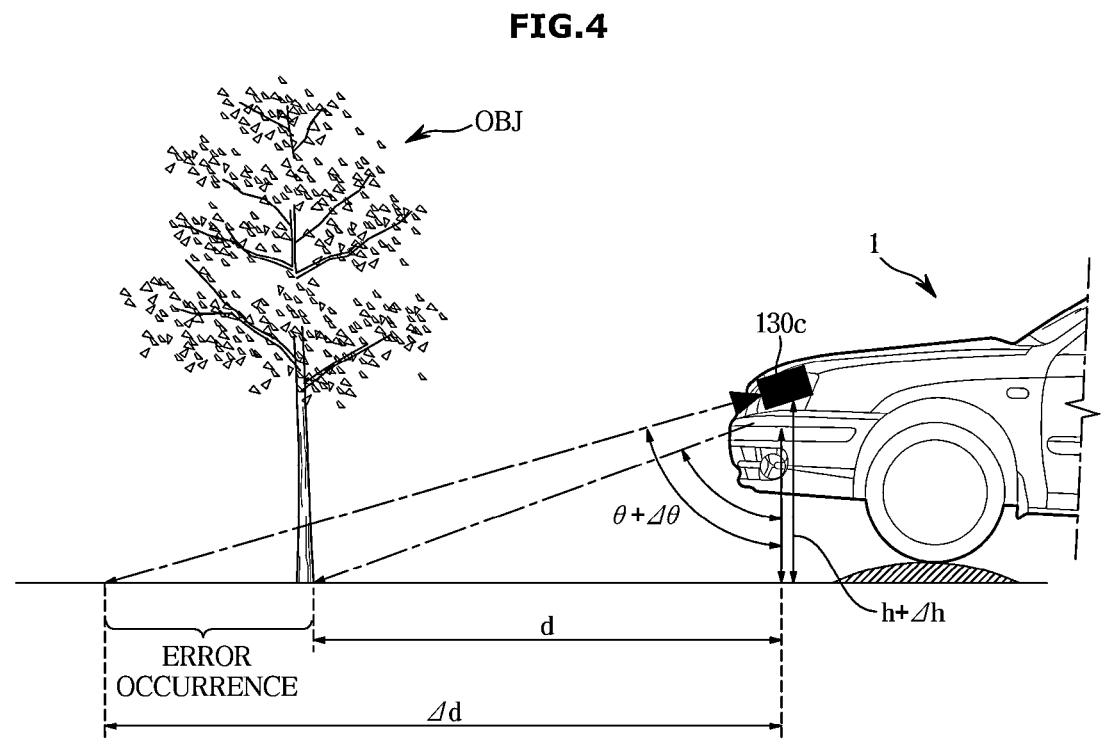

FIGS. 3 and 4 are diagrams illustrating a distance error due to a change in pose of a vehicle according to an embodiment.

Referring to FIGS. 3 and 4, accurate location information of lanes and road markings around a vehicle is required in autonomous driving. Camera geometry is used for distance measurement of lanes and road markings. The camera geometry is a method of calculating a distance to a recognized object using camera pose information.

When a pose of vehicle is changed, however, a pose of the camera mounted on the vehicle is changed as well. Accordingly, an accurate distance to the object may not be calculated.

More specifically, the vehicle 1 recognizes an object OBJ in an image of the front surround view camera 130c and recognizes a distance to the object OBJ through image data processing.

As shown in FIG. 3, the vehicle 1 requires a pose of the front surround view camera 130c based on a road surface in order to recognize a horizontal distance to the object OBJ.

As shown in FIG. 4, a pose of the vehicle 1 may be changed by a topographical factor (a speed bump in FIG. 3), for example, a road with a speed bump or a pothole or an unpaved road. Also, a pose of the vehicle 1 may be changed by rapid acceleration/deceleration of the vehicle 1.

When a pose of the vehicle 1 is changed due to a rear wheel of the vehicle 1 passing the speed bump, a pose of the front surround view camera 130c of the vehicle 1 is also changed. Accordingly, an obtained image is also changed due to the change in pose of the front surround view camera 130c, and thus a distance error may occur in a horizontal distance between the object OBJ and the vehicle 1 recognized through the changed image. In this instance, no change occurs in a pose relationship between the vehicle 1 and the front surround view camera 130c.

Therefore, in order to correct the distance error between the object OBJ and the vehicle 1 due to the change in pose of the vehicle 1, the amount of change in pose of the front surround view camera 130c is required to be estimated, and the pose of the vehicle 1 is required to be estimated based on the amount of change in pose of the front surround view camera 130c.

Hereinafter, for convenience of description, detecting a vanishing point using a front image input from the front camera 110 is described.

Figure 5:
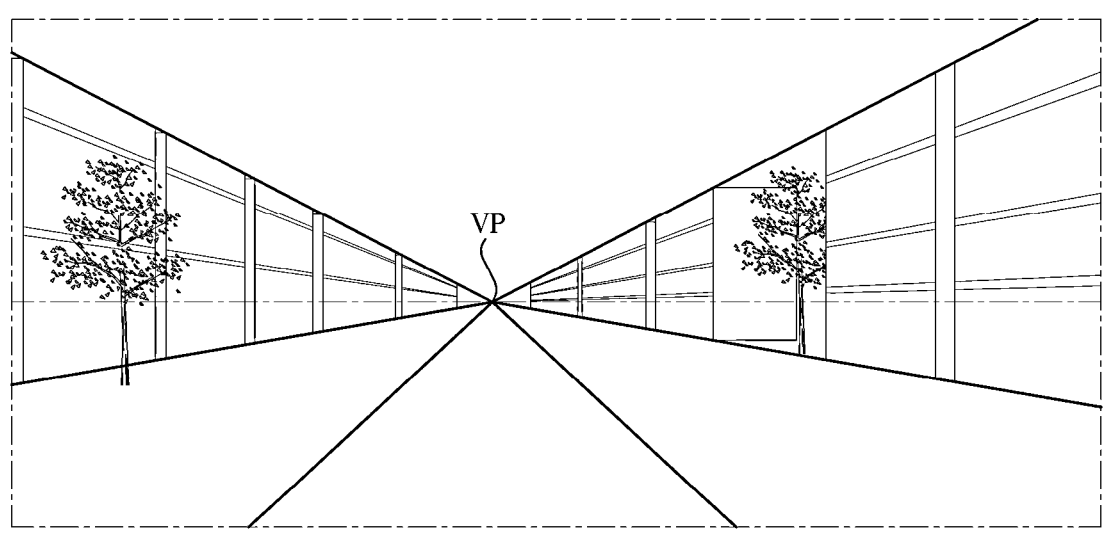
FIG. 5 is a diagram illustrating detecting vanishing points in a front image by a vehicle according to an embodiment.

FIG. 5 is a diagram illustrating detecting vanishing points in a front image by a vehicle according to an embodiment.

Referring to FIG. 5, the controller 200 may determine, as a vanishing point (VP) candidate, intersections where parallel straight lines formed by lanes, buildings, and the like, cross in a front image obtained by the front camera 110.

Figure 6:
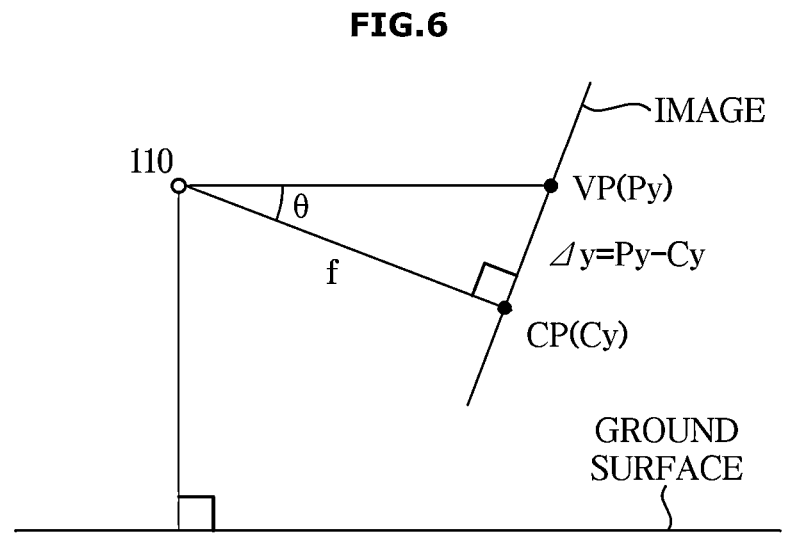

FIG. 6 is a diagram illustrating estimating the amount of change in pose of a front camera based on vanishing points in a front image by a vehicle according to an embodiment.

Referring to FIG. 6, the controller 200 may estimate the amount of change in pose of the front camera 110 based on a vanishing point VP and a center point CP, which is an image principal point in an image of the front camera 110.

The vanishing point VP is a cross point where lines parallel to each other in a real world meet at one point due to a perspective effect when projected onto a front image.

When a tilt of the front camera 110 is 0, the vanishing point appears on a same horizontal line as the center point CP.

When a tilt of the front camera 110 is positive (+), the vanishing point appears below the center point CP.

When a tilt of the front camera 110 is negative (−), the vanishing point appears above the center point CP.

Accordingly, a position of a vanishing point in the front image is determined by a tilt of the front camera 110, and thus the tilt of the front camera 110 may be estimated by obtaining a y-axis coordinate of the vanishing point.

More specifically, the controller 200 may recognize a y-axis coordinate $Cy$ of the center point CP, and a y-axis coordinate $Py$ of the vanishing point VP in the front image.

Based on the y-axis coordinate $Cy$ of the center point CP and the y-axis coordinate $Py$ of the vanishing point VP, a distance $\Delta y$ between the two coordinates may be obtained.

Based on the distance ($\Delta y = Py - Cy$) between the y-axis coordinate $Py$ of the vanishing point VP and the y-axis coordinate $Cy$ of the center point CP and based on a focal length f of the front camera 110 (focal length of camera in y-axis direction), a tilt angle of the front camera 110 ($\theta = a\tan(\Delta y/f)$) may be recognized. Here, the tilt angle of the front camera 110 corresponds to the amount of change in pose of the front camera 110.

As such, the controller 200 may estimate a pose of the front camera 110 based on the vanishing point VP and the center point CP of the front image.

Meanwhile, a vanishing point is accurately detected when two parallel lanes exist. However, when two parallel lanes are not detected or severe noise temporarily occurs due to real-time movement of the vehicle, the vanishing point may not be accurately detected, and thus the pose of the front camera may not be estimated accurately and reliably. Accordingly, a pose of vehicle may not be estimated accurately and reliably.

Thus, accurate and reliable estimation of a pose of the front camera is required to compensate for a tolerance of the front camera and estimate a pose of the vehicle accurately and reliably, even when a vanishing point is not detected or is not accurately detected.

According to an embodiment, the vehicle may estimate a pose of camera using cumulative vanishing point information in which vanishing point candidates in an image input by the camera are accumulated. Thus, the pose of the camera may be estimated accurately and reliably. In other words, according to an embodiment, by using the cumulative vanishing point information to estimate the pose of the camera, the vehicle may have an improved estimation performance robust to noise occurring due to a real-time movement of the vehicle and may overcome a disadvantage of a camera pose estimation method based on a momentary vanishing point. Thus, all the rotation poses of camera such as rolling, yawing, pitching, and the like, may be estimated.

FIG. 7 is a flowchart illustrating a control method of a vehicle according to an embodiment.

Referring to FIG. 7, the vehicle 1 may receive an image from the front camera 110 (300).

The controller 200 may receive a front image obtained by the front camera 110, from the front camera 110.

The vehicle 1 may correct distortion of the image input from the camera (302).

A vanishing point is generated as an intersection where straight lines parallel to each other in a three-dimension (3D) meet at one point when projected onto a two-dimension (2D) image.

The controller 200 may correct distortion of camera lens, before detection of straight lines, in order to detect the straight lines. The controller 200 may correct the distortion of the camera lens using results of end of line (EOL) calibration or a design specification.

The vehicle 1 may detect straight lines formed by contours of objects (or environment) in the distortion-corrected image (304).

The controller 200 may detect edges from the input image and may detect the straight lines by performing Hough transform on the detected edges.

The controller 200 may detect straight line components from lanes, curbs, nearby vehicles, guardrails, road boundaries, buildings, and the like, in the image. Because a specific object is not targeted in the straight line detection, an operation of detecting an object in advance may not be required.

The vehicle 1 may generate a vanishing point candidate based on the straight lines detected from the image (306).

After detecting all the straight lines in the image obtained by the front camera 110, the controller 200 may determine intersections where parallel straight lines cross as the vanishing point candidate. In this instance, although only one of the intersections where the straight lines cross is an actual vanishing point, all the intersections may be determined as the vanishing point candidate, because it may not be accurately identified which intersection is the actual vanishing point.

The controller 200 may obtain the intersections of the straight lines detected from the image and may determine image coordinates of the intersections. The controller 200 may generate the intersections as the vanishing point candidate. A position of the vanishing point candidate may be changed due to a real-time movement of the vehicle 1.

The vehicle 1 may accumulate the vanishing point candidates (308).

The controller 200 may accumulate the vanishing point candidates generated in the input images during driving.

The vehicle 1 may generate a vanishing point accumulation map based on the accumulated vanishing point candidates (310).

The controller 200 may generate the vanishing point accumulation map in which image coordinates of the vanishing point candidates are accumulated.

Figure 8:
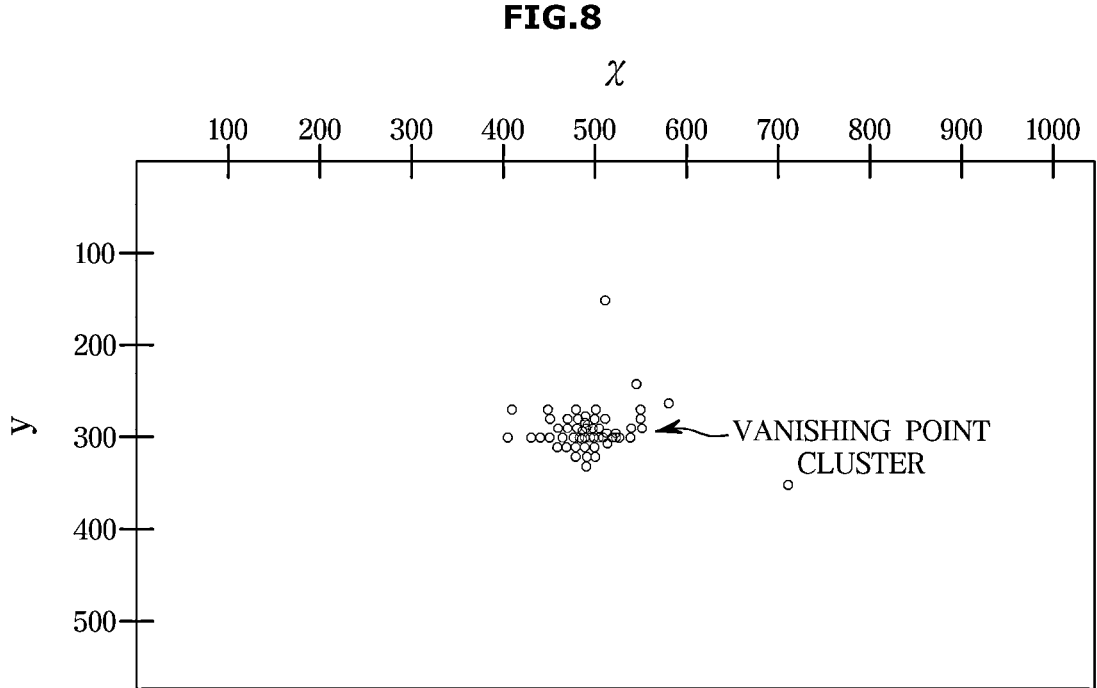
FIG. 8 is a diagram illustrating a vanishing point accumulation map in a vehicle according to an embodiment.

FIG. 8 is a diagram illustrating a vanishing point accumulation map in a vehicle according to an embodiment.

Referring to FIG. 8, a 2D vanishing point accumulation map is shown.

The vanishing point accumulation map shows positions of vanishing point candidates accumulated on an x-axis and y-axis of an image. The x-axis may correspond to a horizontal value of the image and the y-axis may correspond to a vertical value of the image.

When a road surface is uneven or a noise effect is significant such as an unpaved road or a road with a speed bump or pothole, a density of the vanishing point candidates may decrease.

When a road surface is even or a noise effect is insignificant such as a flat road surface without a speed bump or a pothole, a density of the vanishing point candidates may increase.

When a road surface is even, positions of vanishing points may converge to an ideal position.

Referring again to FIG. 7, the vehicle 1 may determine vanishing point cluster information by analyzing the vanishing point accumulation map (312).

The controller 200 may analyze a vanishing point cluster through a statistical analysis of the vanishing point accumulation map.

Mostly, the vehicle 1 drives straight along a road in a flat environment.

In driving straight, straight lines detected from lanes, curbs, guardrails, road boundaries, buildings, and the like, are parallel to the vehicle driving direction.

The straight lines parallel to the vehicle driving direction form a single vanishing point in the image.

Coordinates of the vanishing point may be changed according to a movement of the vehicle, and a cluster may be formed by accumulating moving vanishing points.

The vanishing point cluster information indicates information about the vehicle driving direction, and angle information of the front camera 110 may be estimated through a relationship with an image principal point.

Figure 9:
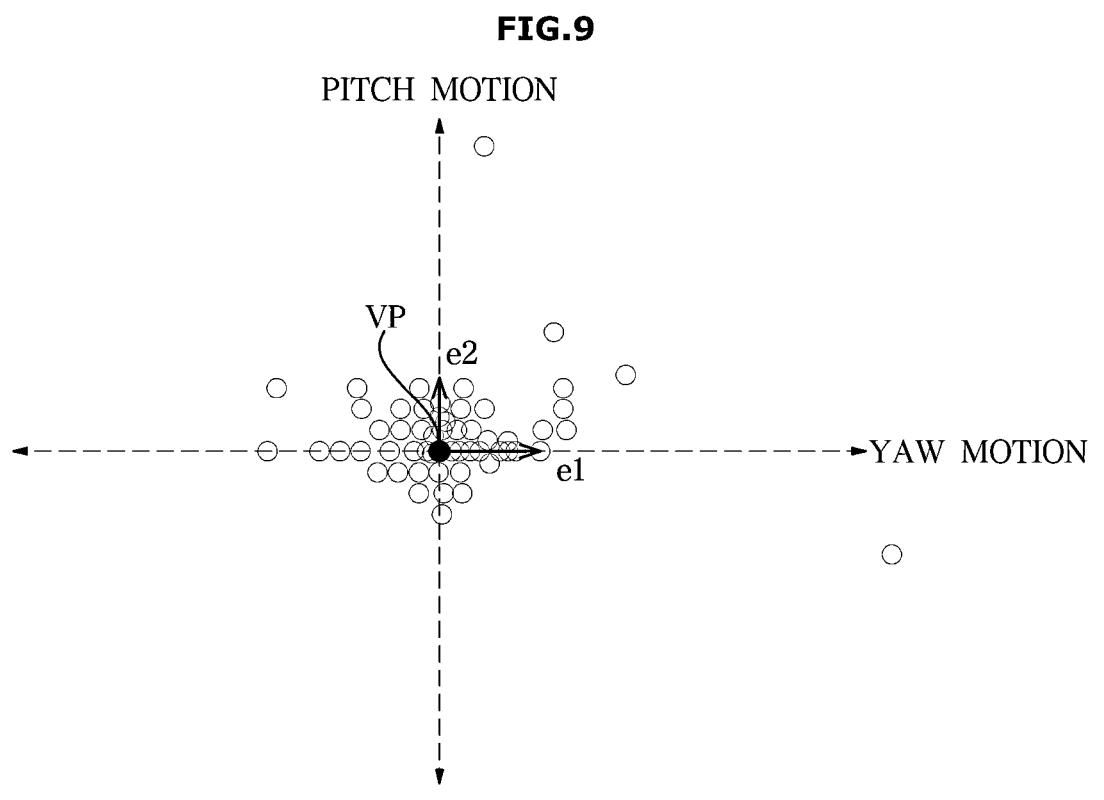

FIG. 9 is a diagram illustrating a principal component analysis in a vanishing point accumulation map in a vehicle according to an embodiment.

Referring to FIG. 9, vanishing point candidates in a vanishing point accumulation map are all the intersections where straight lines parallel to each other in an image obtained by the front camera 110 cross.

When a road surface is uneven or a noise effect is significant, a density of the vanishing point candidates may be low, because intersections are scattered.

By contrast, when a road surface is even or a noise effect is insignificant, a density of the vanishing point candidates may be high.

Accordingly, a vanishing point cluster may be analyzed through a statistical analysis of the vanishing point accumulation map.

A principal component analysis (PCA) may be used to analyze a vanishing point cluster distribution of the vanishing point accumulation map.

Principal components of the vanishing point cluster distribution of the vanishing point accumulation map may be found by using the PCA.

Characteristics of the vanishing point cluster distribution of the vanishing point accumulation map may be represented by two vectors by using the PCA.

By performing the PCA on the vanishing point cluster of 2D vanishing point accumulation map, a first principal component vector e1 having a largest variance of the clustered vanishing point candidates and a second principal component vector e2 perpendicular to the first principal component vector and having a largest variance may be obtained.

When a direction and magnitude of the first principal component vector e1 and a direction and magnitude of the second principal component vector e2 are known, a shape of the vanishing point cluster distribution may be identified most simply and effectively from a relationship between the first principal component vector e1 and the second principal component vector e2.

In the PCA, an intersection of the first principal component vector e1 and the second principal component vector e2 perpendicular to each other may be the same as average coordinates (representative vanishing point) of the vanishing point cluster and may include information about a vehicle driving direction. The representative vanishing point may be the intersection of the first principal component vector e1 and the second principal component vector e2 and may be a mode point of the vanishing point cluster.

The first principal component vector e1 may be generated when a vehicle driving direction changes such as during a lane change or driving on a curve.

The first principal component vector e1 may be generated by changing a yaw direction of the vehicle in a straight driving direction of the vehicle.

The first principal component vector e1 may be parallel to a vanishing line or the horizon in the image. The first principal component vector e1 may represent rotation information of the front camera 110 in a roll direction in a vehicle coordinate system.

The second principal component vector e2 may be generated when the vehicle vibrates in a direction perpendicular to the ground due to a gradient of a road on which the vehicle travels. The second principal component vector e2 may be generated based on a change of the vehicle in a pitch direction. The second principal component vector e2 may represent rotation information of the front camera 110 in a tilt direction.

Two motions in directions perpendicular to each other in 3D are projected onto the image, and thus the second principal component vector e2 may be perpendicular to the first principal component vector e1 in the vanishing point accumulation map.

A relative angle of the front camera 110 mounted on the vehicle may be estimated using a relationship between the representative vanishing point VP and an image principal point CP together with the first principal component vector e1 and the second principal component vector e2.

Referring again to FIG. 7, the vehicle 1 may estimate a pose of the camera based on the vanishing point cluster information (314).

Mounting angle information of the camera mounted on the vehicle may be estimated by analyzing the vanishing point cluster information in the vanishing point accumulation map.

Figure 10:
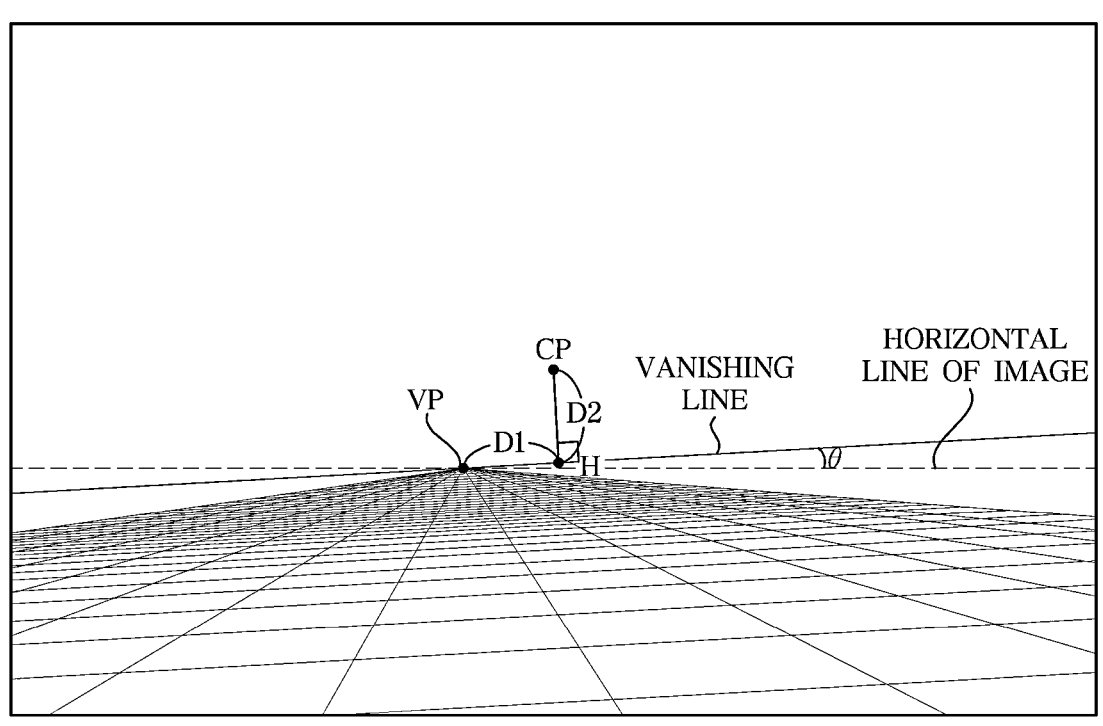
FIG. 10 is a diagram illustrating estimation of a pose of a camera using a relationship among a representative vanishing point, a vanishing line, and an image principal point in a vehicle according to an embodiment.

FIG. 10 is a diagram illustrating estimation of a pose of a camera using a relationship among a representative vanishing point, a vanishing line, and an image principal point in a vehicle according to an embodiment.

Referring to FIG. 10, applying a representative vanishing point VP and a vanishing line obtained through the PCA to an image obtained by the front camera 110 is illustrated.

The vehicle 1 may obtain the representative vanishing point VP, which is an intersection of a first principal component vector et and a second principal component vector e2 of a vanishing point cluster distribution, and the vehicle 1 may obtain the vanishing line, which passes the representative vanishing point VP and is parallel to the first principal component vector e1, using the PCA.

CP is a principal point of the image obtained by the front camera.

A roll angle of the front camera 110 may be estimated based on a degree of slope of the vanishing line. Because the vanishing line is parallel to the first principal component vector e1, the more the vanishing line slopes, the greater the roll angle. An angle θ corresponding to a difference between the slope of the vanishing line and a slope of a horizontal line of the image represents the roll angle of the front camera 110.

In the image, a CP-H line segment represents a perpendicular line drawn from the image principal point CP to the vanishing line, and H is a foot of perpendicular, which is the intersection of the perpendicular line and the vanishing line.

D1 is a distance between the representative vanishing point VP and the foot of perpendicular H, and D2 is a distance between the image principal point CP and the foot of perpendicular H.

A pitch (tilt) of the front camera 110 may be estimated based on the distance D2 when drawn from the image principal point CP to the vanishing line with the perpendicular line. For example, because the pitch increases when the front camera 110 is bent forward a lot or faces toward the sky, D2 also increases.

A yaw angle of the front camera 110 may be estimated based on the distance D1 when drawn from the representative vanishing point VP to the vanishing line with the perpendicular line. For example, when the front camera 110 moves a lot from side to side, the yaw angle increases, and thus D1 also increases.

As such, the vehicle 1 may estimate the roll angle, the pitch angle, and the yaw angle of the front camera 110 using a relationship of the representative vanishing point, the vanishing line, and the image principal point. Accordingly, any rotation pose of the front camera 110 may be estimated.

Afterwards, the vehicle 1 may calculate a tolerance between a mounting angle of the front camera 110 and a mounting angle of design specification, thereby compensating for the tolerance of the front camera 110.

As described above, the vehicle according to an embodiment of the present disclosure may estimate all the rotation poses of camera, such as rolling, yawing, pitching, etc., by using cumulative vanishing point information in which vanishing point candidates in an image input by the camera are accumulated, and the vehicle may have a performance robust to real-time noise components, and thus estimation of camera pose may be performed accurately and reliably.

As is apparent from the above, according to the embodiments of the disclosure, a pose of a camera can be estimated using cumulative vanishing point information in which vanishing point candidates in an image input by the camera mounted on a vehicle are accumulated.

According to the embodiments of the disclosure, rolling, yawing and pitching of a camera can be estimated using cumulative vanishing point information in which vanishing point candidates in an image input by the camera are accumulated.

According to the embodiments of the disclosure, a pose of a camera can be accurately and reliably estimated during driving, and thus a quality of an around-view image through tolerance compensation of camera may be improved.

Meanwhile, the aforementioned controller and/or its constituent components may include at least one processor/microprocessor(s) combined with a computer-readable recording storing medium a computer-readable code/algorithm/software. The processor/microprocessor(s) may execute the computer-readable code/algorithm/software stored in the computer-readable recording medium to perform the above-descried functions, operations, steps, and the like.

The aforementioned controller and/or its constituent components may further include a memory implemented as a non-transitory computer-readable recording medium or transitory computer-readable recording medium. The memory may be controlled by the aforementioned controller and/or its constituent components and configured to store data, transmitted to or received from the aforementioned controller and/or its constituent components or store data processed or to be processed by the aforementioned controller and/or its constituent components.

The disclosed embodiment may be implemented as the computer-readable code/algorithm/software in the computer-readable recording medium. The computer-readable recording medium may be a non-transitory computer-readable recording medium, such as a data storage device capable of storing data readable by the processor/microprocessor(s). For example, the computer-readable recording medium may be a hard disk drive (HDD), a solid state drive (SSD), a silicon disk drive (SDD), a read only memory (ROM), a compact disc read only memory (CD-ROM), a magnetic tape, a floppy disk, an optical recording medium, and the like.

What is claimed is:

1. A control method of a vehicle, the control method comprising:
   detecting straight lines in an image input from a camera;
   generating a vanishing point candidate based on an intersection of the straight lines;
   accumulating the vanishing point candidate;
   generating a vanishing point accumulation map based on the accumulated vanishing point candidates;
   estimating a pose of the camera based on vanishing point cluster information of the vanishing point accumulation map; and
   adjusting a distance to an object in the image based on the pose of the camera,
   wherein estimating the pose of the camera comprises:
   determining the vanishing point cluster information of the vanishing point accumulation map, and
   wherein determining the vanishing point cluster information comprises:
   performing a principal component analysis on a vanishing point cluster of the vanishing point accumulation map; and determining the vanishing point cluster information according to a result of the principal component analysis.

2. The control method of claim 1, wherein generating the vanishing point candidate comprises obtaining the intersection of the straight lines and generating the obtained intersection as the vanishing point candidate.

3. The control method of claim 1, wherein accumulating the vanishing point candidate comprises accumulating the vanishing point candidates generated while the vehicle is driving.

4. The control method of claim 1, wherein generating the vanishing point accumulation map comprises generating a two-dimensional (2D) vanishing point accumulation map based on image coordinates of the accumulated vanishing point candidates.

5. The control method of claim 1, wherein estimating the pose of the camera comprises:
   estimating the pose of the camera based on the vanishing point cluster information.

6. The control method of claim 5, wherein determining the vanishing point cluster information comprises:
   obtaining a first principal component vector and a second principal component vector perpendicular to the first principal component vector according to a variance of the vanishing point cluster through the principal component analysis of the vanishing point cluster; and
   determining a representative vanishing point and a vanishing line of the vanishing point cluster based on the first principal component vector and the second principal component vector.

7. The control method of claim 6, wherein determining the representative vanishing point and the vanishing line comprises:
   determining an intersection of the first principal component vector and the second principal component vector as the representative vanishing point; and
   determining a straight line that passes the representative vanishing point and is parallel to the first principal component vector as the vanishing line.

8. The control method of claim 7, wherein estimating the pose of the camera comprises estimating the pose of the camera based on the vanishing line and the representative vanishing point of the vanishing point cluster information.

9. The control method of claim 8, wherein estimating the pose of the camera comprises estimating a roll angle, a yaw angle and a pitch angle of the camera based on the representative vanishing point and the vanishing line.

10. The control method of claim 9, wherein estimating the pose of the camera comprises estimating the roll angle of the camera based on a difference between a slope of the vanishing line and a slope of a horizontal line of the image.

11. The control method of claim 9, wherein estimating the pose of the camera comprises estimating the yaw angle of the camera based on a distance between the representative vanishing point and a foot of a perpendicular line from an image principal point to the vanishing line.

12. The control method of claim 9, wherein estimating the pose of the camera comprises estimating the pitch angle of the camera based on a distance between an image principal point and a foot of a perpendicular line from the image principal point to the vanishing line.

13. The control method of claim 9, further comprising:
   comparing at least one of the estimated roll angle, the estimated yaw angle, or the estimated pitch angle with a mounting angle of a design specification; and 15 16 compensating for a tolerance of the camera according to a result of the comparison.

14. A vehicle, comprising:

a camera configured to photograph an area around the vehicle; and a controller configured to be electrically connected to the camera, wherein the controller is configured to:

detect straight lines in an image input from the camera, generate a vanishing point candidate based on an intersection of the straight lines, accumulate the vanishing point candidate, generate a vanishing point accumulation map in which the vanishing point candidates are accumulated, estimate a pose of the camera based on vanishing point cluster information of the vanishing point accumulation map, and correct a distance to an object in the image based on the pose of the camera, wherein the controller is further configured to:

perform a principal component analysis on a vanishing point cluster of the vanishing point accumulation map; and determine the vanishing point cluster information according to a result of the principal component analysis.

15. The vehicle of claim 14, wherein the controller is further configured to:

estimate the pose of the camera based on the vanishing point cluster information.

16. The vehicle of claim 15, wherein the controller is further configured to:

obtain a first principal component vector and a second principal component vector perpendicular to the first principal component vector according to a variance of the vanishing point cluster through the principal component analysis of the vanishing point cluster, determine an intersection of the first principal component vector and the second principal component vector as a representative vanishing point, and determine a straight line that passes the representative vanishing point and is parallel to the first principal component vector as a vanishing line.

17. The vehicle of claim 16, wherein the controller is configured to estimate a roll angle of the camera based on a difference between a slope of the vanishing line and a slope of a horizontal line of the image.

18. The vehicle of claim 16, wherein the controller is configured to estimate a yaw angle of the camera based on a distance between the representative vanishing point and a foot of a perpendicular line from an image principal point to the vanishing line.

19. The vehicle of claim 16, wherein the controller is further configured to estimate a pitch angle of the camera based on a distance between an image principal point and a foot of a perpendicular line from the image principal point to the vanishing line.

* * * * *